(12) United States Patent
Rogson

(10) Patent No.: US 6,499,693 B1
(45) Date of Patent: Dec. 31, 2002

(54) AIRCRAFT TO RESPOND TO THREATS

(76) Inventor: Ariel S. Rogson, 6854 SW. Ashdale Dr., Portland, OR (US) 97223

( * ) Notice: Subject to any disclaimer, the term of this patent is extended or adjusted under 35 U.S.C. 154(b) by 0 days.

(21) Appl. No.: 09/683,740

(22) Filed: Feb. 8, 2002

(51) Int. Cl.[7] .............................................. B64D 11/00
(52) U.S. Cl. ................................ 244/118.5; 244/118.6; 244/121; 244/137.1; 244/128
(58) Field of Search ........................... 244/118.5, 118.6, 244/121, 137.1, 128

(56) References Cited

U.S. PATENT DOCUMENTS

| | | | | |
|---|---|---|---|---|
| 1,614,739 A | * | 1/1927 | Lawrence | 102/367 |
| 3,658,277 A | * | 4/1972 | Anderson | 109/8 |
| 3,680,499 A | * | 8/1972 | Boudreau | 109/32 |
| 3,704,845 A | * | 12/1972 | Ord | 244/118.5 |
| 4,112,818 A | * | 9/1978 | Garehime, Jr. | 109/9 |
| 4,522,359 A | * | 6/1985 | Church et al. | 244/129.4 |
| 5,875,997 A | * | 3/1999 | Al-Sabah | 244/118.5 |
| 6,158,692 A | * | 12/2000 | Abild et al. | 244/118.5 |

* cited by examiner

Primary Examiner—Charles T. Jordan
Assistant Examiner—Stephen A Holzen
(74) Attorney, Agent, or Firm—Marger Johnson & McCollom, P.C.

(57) ABSTRACT

To respond to internal threats to the aircraft, an incapacitating aerosol can be released into the cabin of the aircraft. The incapacitating aerosol prevents the hijackers or terrorists from accomplishing their goals. While the hijackers or terrorists are incapacitated, the pilot can land the aircraft at the first opportunity and let trained security forces, such as the police, board the aircraft and deal with the hijackers/terrorists.

10 Claims, 7 Drawing Sheets

```
                    Start
                      │
                      ▼
            505 ┌──────────────┐
                │ Install a ventilation │
                │  system into the  │
                │      aircraft     │
                └──────────────┘
                  │           │
        510 ┌─────┘           └─────┐ 515
            ▼                       ▼
┌───────────────────┐   ┌───────────────────┐
│ Provide for a fixed│   │  Provide a second  │
│ respiration system in│  │ ventilation system │
│  the cockpit of the │   │ for the cockpit of the│
│      aircraft      │   │      aircraft      │
└───────────────────┘   └───────────────────┘
              │                  │
              └─────────┬────────┘
                        ▼
          520  ┌────────────────────┐
               │    Connect an      │
               │ incapacitating, fast-│
               │  acting, colorless, │
               │  oderless aerosol  │
               └────────────────────┘
                        │
                        ▼
          525  ┌────────────────────┐
               │ Connect the aerosol│
               │  to a switch in the │
               │ cockpit of the aircraft│
               └────────────────────┘
                        │
                        └──────────▶ (A)
```

FIG. 5A

```
                    ┌───┐
                    │ A │
                    └─┬─┘
                      ▼
 530                                545
  ┌──────────────────────┐           ┌──────────────────────┐
  │  Secure the cockpit/ │           │ Provide breatheable  │
  │  door against access │           │ air to persons in the│
  │     from the cabin   │           │ cockpit of the aircraft
  │                      │           │       (FIG. 6)       │
  └──────────┬───────────┘           └──────────┬───────────┘
             │                                  │
 535         ▼                      550         ▼
  ┌──────────────────────┐           ┌──────────────────────┐
  │   Fly the aircraft   │           │  Release the aerosol │
  │                      │           │  into the ventilation│
  │                      │           │        system        │
  └──────────┬───────────┘           └──────────┬───────────┘
             │                                  │
 540         ▼                      555         ▼
        ◇ Is a ◇                     ┌──────────────────────┐
      threat to the    Yes           │  Land the aircraft as│
        aircraft      ────▶          │   soon as possible   │
        detected?                    └──────────┬───────────┘
             │                                  │
             │ No                  560          ▼
             │                     ┌──────────────────────┐
             │                     │   Let the aircraft be│
             │                     │  boarded by security │
             │                     │        forces        │
             │                     └──────────┬───────────┘
             │                                │
                                              ▼
             FIG. 5B                      (  End  )
```

AIRCRAFT TO RESPOND TO THREATS

BACKGROUND OF INVENTION

1. Field

This invention pertains to airplane passenger transportation, and more particularly to providing a way to respond to internal threats to aircraft.

2. BACKGROUND

The events of Sep. 11, 2001, will forever be ingrained in the collective memory of the world. Once thought to be relegated to less politically stable parts of the world, terrorism has been brought, in a dramatic manner, to the United States. Persons in the developed world can no longer ignore the possibility of terrorism striking them personally.

The possibility of an "airplane missile" was known to U.S. intelligence agencies long before Sep. 11, 2001, but was largely considered to be an unlikely possibility. The actions of the Al Qaeda terrorist network have shown that that possibility is no longer remote.

The primary response to the attacks of Sep. 11, 2001, has been to improve airport-security, in an attempt to prevent terrorists from boarding the aircraft in the first place. Stringent security guidelines now mostly prevent passengers (and terrorists) from bringing obvious weapons (such as guns and knives) on board aircraft. Anyone who looks like they might be a threat to an aircraft is singled out for closer scrutiny. And at least one airline captain has encouraged passengers to rise up against potential hijackers (http://www.snopes.com/rumors/pilot.htm). (This latter response parallels the efforts of the passengers of United Airlines flight 93, who realized that their aircraft was destined to be another terrorist "airplane missile" and overpowered their hijackers, at the cost of their own lives.)But even the most strict security guidelines are unlikely to prevent all future hijacking or terrorist incidents. Witness the events surrounding American Airlines flight AA63. Despite the increased security response to the events of Sep. 11, 2001, Richard Reid was able to bring aboard an explosive device inside his shoe, which he tried to detonate in midair. An alert crew and responsive passengers subdued Mr. Reid, preventing him from fulfilling his intentions. Nevertheless, the mere fact that he came as close as he did to completing his goals shows that increased security is, at best, only part of an overall approach to securing transportation lines.

And exhorting passengers, as the above-referenced United Airlines captain did, has other weaknesses. Depending on unarmed passengers to help police aircraft assumes that passengers are capable or willing to overcome hijackers or terrorists. Such might not always be the case. In addition, if the hijackers or terrorists are able to smuggle a weapon on board, passengers might lose their lives in a futile attempt to overpower the hijackers or terrorists. Finally, hijackers or terrorists can bring aboard the aircraft objects that, while not weapons in the traditional sense, are useable in that way, giving the hijackers or terrorists an advantage over other passengers.

Other proposed security measures are less likely to be successful. One suggestion was to store a weapon (such as a gun) in the cockpit of the aircraft. The theory is that by arming the cockpit crew of the aircraft, the cockpit crew would be able to overcome the hijackers or terrorists through superior weaponry. But this theory overlooks the fact that the hijacker or terrorist need only take a hostage and demand the weapon in exchange for the hostage's life. It is difficult to imagine that an ordinary citizen, not trained in responding to hostage/terrorist situations, would fail to hand over a gun to prevent the execution of a passenger (especially where the citizen is charged with the safety of the passenger). Arming the cockpit crew simply provides the hijackers/terrorists with a better weapon, and one that they (theoretically) cannot bring aboard themselves.

There may be no solution to terrorists who simply want to kill or destroy, like the terrorists who bombed Pan American Flight 103 over Lockerbie, Scotland on Dec. 21, 1988. All the terrorists need to do is place a bomb on the aircraft and wait for it to explode. But where a more "surgical" effort is desired, direct involvement by terrorists is needed. Factor in that most terrorists, as much as anyone else, want to live one more day, and often the mere destruction of the aircraft is no longer certain.

Accordingly, a need remains for a way prevent hijackers and terrorists from commandeering aircraft and other transportation means for their own purposes, without risking loss of life to either the persons on board the aircraft or transportation means or on the ground, to address these and other problems associated with the prior art.

SUMMARY OF INVENTION

The invention is an improvement to aircraft and other transportation means, and a method for using the improved aircraft or transportation means. The aircraft or other transportation means is modified to provide a way to release an incapacitating aerosol into the ventilation system of the aircraft or other transportation means. At the first sign of an internal threat to the aircraft or other transportation means, the pilot or controller of the aircraft or transportation means releases the incapacitating aerosol into the ventilation system. Once the threat to the aircraft is temporarily neutralized by the incapacitating aerosol, the pilot or controller of the aircraft or transportation means guides the aircraft or transportation means to a secure location, where security forces (such as the police) can board the aircraft or transportation means and permanently neutralize the threat.

The foregoing and other features, objects, and advantages of the invention will become more readily apparent from the following detailed description, which proceeds with reference to the accompanying drawings.

BRIEF DESCRIPTION OF DRAWINGS

FIGS. 5A and 5B show a flowchart for responding to an internal threat to the aircraft, according to an embodiment of the invention.

DETAILED DESCRIPTION

Although the description below is specific to airplanes, a person skilled in the art will recognize that the embodiments of the invention are equally applicable to other modes of public transportation. For example, with modification the invention is applicable to buses and trains. Certain limitations of other modes of transportation can require that the embodiments of the invention be modified (for example, buses typically do not have a separate compartment isolating the driver from the passengers, and thus either a compartment needs to be added or only the fixed respiration system should be used). In addition, other modifications to the modes of transportation are necessary to effectively use the embodiments of the invention (for example, buses and trains would need to prevent windows from being opened). But once the necessary modifications are made, the embodiments of the invention are entirely compatible with the other modes of transportation.

Figure 1:
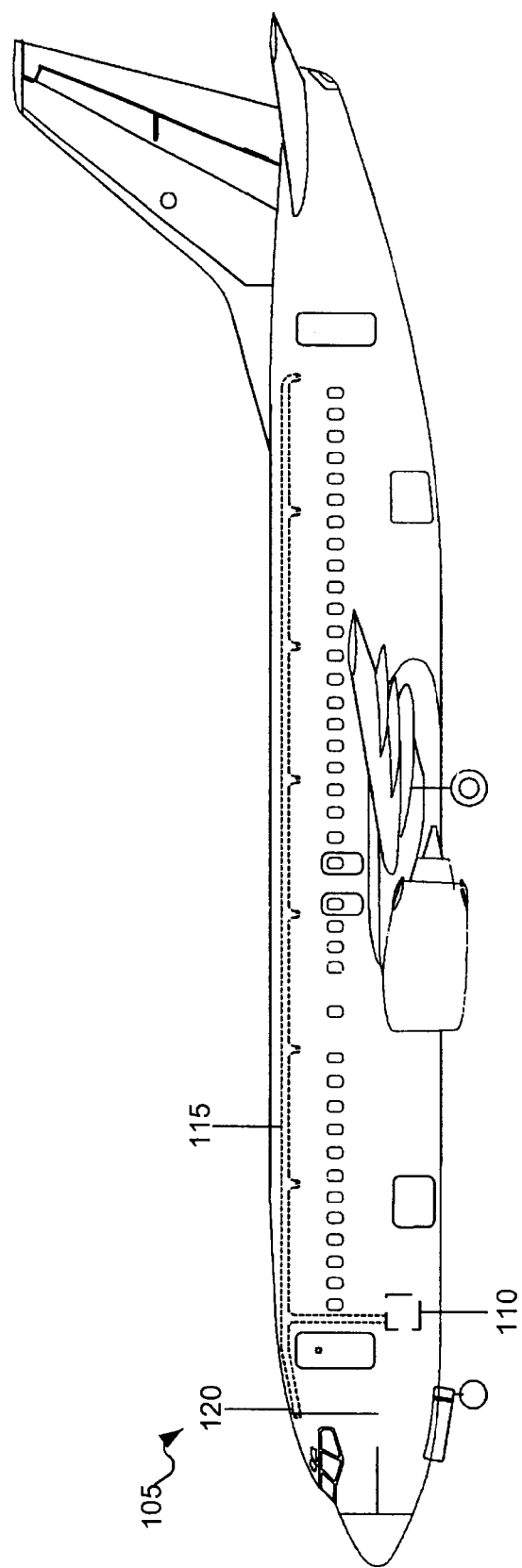
FIG. 1 shows an aircraft with a ventilation system according to an embodiment of the invention.

FIG. 1 shows an aircraft with a ventilation system according to an embodiment of the invention. In FIG. 1, aircraft 105 includes a ventilation system. The ventilation system includes a blower 110 and vents 115. Blower 110 takes air, processes it as is normal for aircraft (for example, the moisture content of the air can be reduced, the air can be warmed or cooled to a desired temperature, and the air can be filtered and oxygenated as needed).

Blower 115 also includes the capability of releasing an incapacitating aerosol into the air circulated through aircraft 105. This is explained further with reference to FIG. 4 below.) The air is then funneled to vents 115, which release the air throughout the aircraft. (As described below with reference to FIG. 4, the cockpit personnel can be protected from breathing in the incapacitating aerosol with respiration systems designed to filter out the incapacitating aerosol.) Note specifically that in FIG. 1, aircraft 105 includes vent 120, which releases air into the cockpit of the aircraft. As explained with reference to FIG. 2 below, this is not required, but provides for an embodiment of the invention with only a single ventilation system for aircraft 105.

FIG. 2 shows the aircraft of FIG. 1 with a second ventilation system for the cockpit of the aircraft, according to an embodiment of the invention. In FIG. 2, blower 210 blows air through vents 205 only through the cabin. The cockpit of the aircraft is isolated from the cabin, preventing the mingling of air. Instead, the cockpit of the aircraft has its own ventilation system, including blower 220 and vents 225. By providing separate ventilation systems for the cockpit and cabin of aircraft 105, if the incapacitating aerosol is released into the cabin of aircraft 105, the air in the cockpit of aircraft 105 will not incapacitate the pilot of aircraft 105.

Note that in FIG. 2, the cockpit of aircraft 105 is accessed from a separate door 230. Part of protecting aircraft 105 from being hijacked or controlled by terrorists includes preventing hijackers or terrorists from gaining access to the cockpit of aircraft 105. By using a separate door to access the cockpit of aircraft 105, terrorists and hijackers are denied the ability to enter the cockpit and in any way operate aircraft 105.

Although using a separate door for accessing the cockpit of the aircraft is preferable in physically isolating the cockpit of the aircraft from the cabin of the aircraft, it is recognized that for the numerous aircraft already in use, redesigning them to include a separate outer door for the cockpit is infeasible. In addition, unless additional facilities are provided to the occupants of the cockpit of the aircraft (such as a bathroom), designing future aircraft with a separate door for accessing the cockpit of the aircraft only from outside the aircraft may be impractical. Accordingly, FIG. 3 shows a door to the cockpit of the aircraft of FIG. 1 that can be sealed, the door designed so that it can be barred from entry from the cabin of the aircraft, according to an embodiment of the invention.

In FIG. 3, door 305 includes bar 310. Bar 310 swings down and falls into bracket 315. Bracket 315 catches bar 310, preventing it from swinging any further down. Bracket 315 also prevents door 305 from opening, as bar 310 cannot be swung away from door 305 (both because bar 310 is not hinged to swing in that direction, and because bracket 315 includes a catch that prevents bar 310 from swinging in the horizontal plane).

Bar 310 is connected to the wall using hinge 320 (possibly mounted on a plate or directly to a wall of the cockpit; neither the plate nor the wall are shown in FIG. 3). Hinge 320 is designed so that bar 310 will always swing down. In other words, bar 310 will not remain in any position or orientation other than that shown in FIG. 3 without an outside force acting on bar 310. This means that once door 305 is shut, bar 310 automatically barricades door 305, preventing anyone outside the cockpit from accessing the cockpit without the active cooperation of someone inside the cockpit.

Preferably, bar 310, bracket 315, and hinge 320 are made of durable materials, that will not give easily to pounding on door 305. For example, casehardened steel can be used to manufacture bar 310, bracket 315, and hinge 320. A person skilled in the art will recognize other materials that can be used.

Variations on bar 310 are possible. For example, bracket 315 can include a switch (not shown in FIG. 3), such as a dead man's switch. If bar 310 is removed from bracket 315 for an excessive length of time, the dead man's switch can cause some reaction, such as automatically releasing the incapacitating aerosol (as described with reference to FIG. 4 below), dumping fuel from the aircraft (thereby severely limiting its range, which can hamper terrorist efforts), or disabling parts of the aircraft (such as the engine). Obviously, disabling the engines of the aircraft are likely to cause the aircraft to crash without skilled hands guiding the aircraft, but such a possibility is presented only as an example of a use of the dead man's switch.

Another variation is to include a lock with bracket 315. Then, opening moving bar 310 (a necessary precursor to opening door 305) would require the depressing of a switch to release the lock. (Such a switch can be located on a panel in the cockpit.) The use of such a lock would complicate the egress of persons from the cockpit, as both entry and exit would require a second person inside the cockpit.

A person skilled in the art will recognize that other methods for barring door 305 can be used, such as a lock built into the doorknob of door 305. Once the door is shut, the lock can trip, preventing anyone outside the cockpit from accessing the cockpit without cooperation from inside the cockpit. But bar 310 is a simple means for barricading the cockpit of the aircraft, and variations are currently being installed in the cockpits of aircraft to increase cockpit security.

In yet another variation, door 305 includes seal 325. Seal 325 is preferably an inflatable bladder that goes around the periphery of door 305. (Seal 325 can also include a series of different inflatable bladders, rather than a single bladder going all the way around the door.) Seal 325 can be inflated by activating a button within the cockpit of the aircraft. By inflating the bladder of seal 325, the cockpit of the aircraft can be isolated environmentally from the cabin of the aircraft. This variation is most useful where the cockpit of the aircraft and the cabin of the aircraft have separate ventilation systems, but can be used in combination with any of the embodiments of the invention. Seal 325, by environmentally isolating the cockpit of the aircraft, helps prevent any of the incapacitating aerosol from seeping into the cockpit of the aircraft, thereby potentially incapacitating the pilot and other cockpit crew. Seal 325 can also be tied into the switch used to release the incapacitating aerosol, automatically sealing the cockpit of the aircraft environmentally from the cabin of the aircraft when the incapacitating aerosol is released.

In yet another variation, seal 325 can be tied to the operation of the aircraft, requiring that the cockpit of the aircraft be sealed environmentally before the aircraft can be used. This can also help prevent entry of terrorists or hijackers into the cockpit of the aircraft from the cabin of the aircraft.

Figure 4:
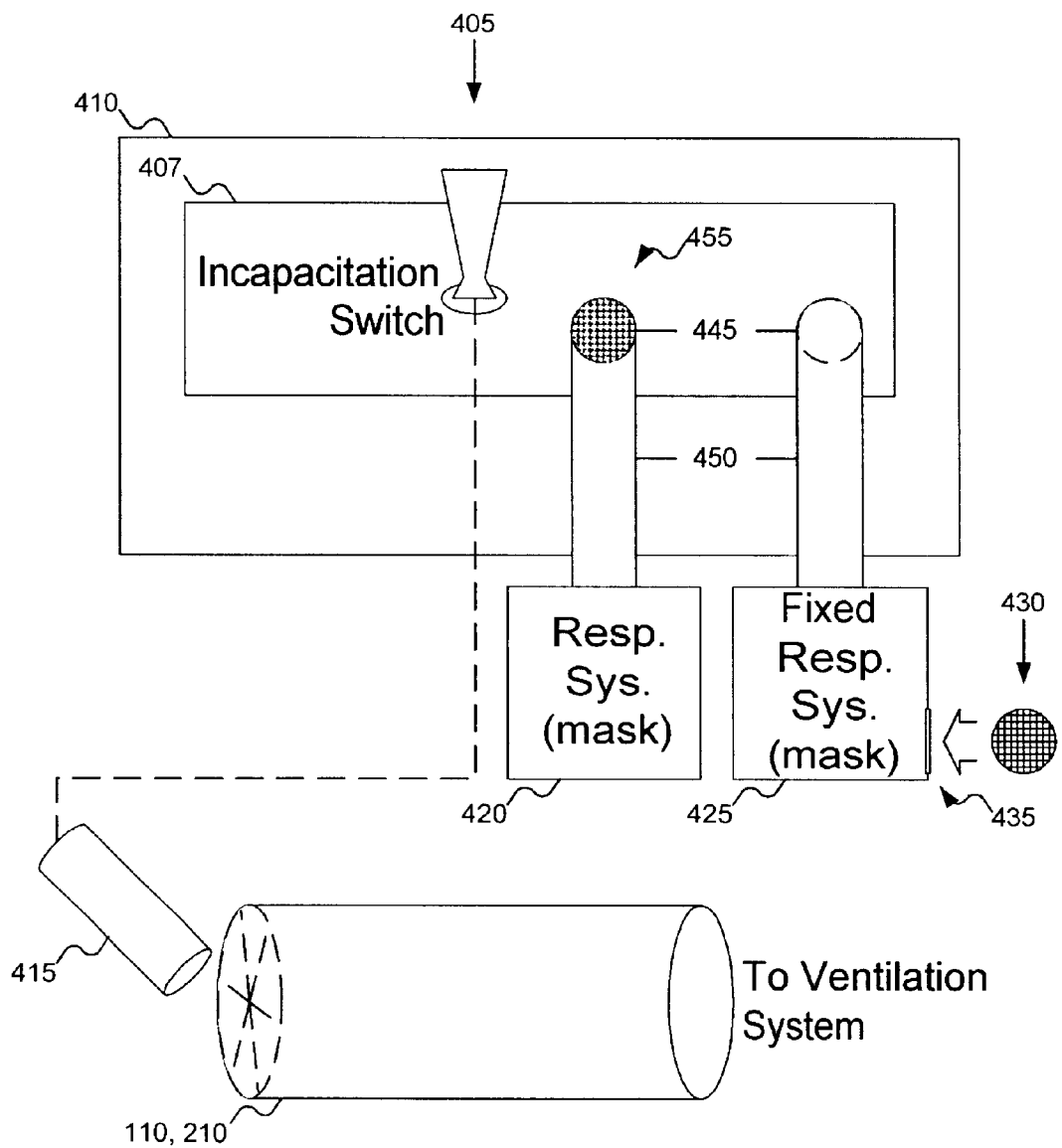
FIG. 4 shows a switch in the cockpit of the aircraft of FIG. 1, enabling the pilot to activate the incapacitating aerosol, according to an embodiment of the invention.

FIG. 4 shows a switch in the cockpit of the aircraft of FIG. 1, enabling the pilot to activate the incapacitating aerosol, according to an embodiment of the invention. In FIG. 4, switch 410 is installed on panel 407 in cockpit 410. When the pilot receives warning of a threat internal to the aircraft involving persons (obviously, the presence of a bomb on board the aircraft that can be remotely detonated would not require the use of an incapacitating aerosol, since the threat would not be affected by the incapacitating aerosol), the pilot flips switch 405. By flipping switch 405, a signal is sent to canister 415, which stores the incapacitating aerosol. Preferably, the incapacitating aerosol is a colorless, odorless, fast-acting gas that will disable all persons in the cabin of the aircraft, and will incapacitate an individual even if they are using some article of clothing to filter the air they breathe. For example, an aerosol anesthetic can be used. In another embodiment, the incapacitating aerosol is not an anesthetic, but simply a nausea-inducing agent, that can incapacitate without anesthetizing people. Upon receiving the signal, canister 415 releases the incapacitating aerosol into the ventilation systems, preferably through blower 110, 210.

The release of the incapacitating aerosol is preferably undetectable to any of the passengers in the cabin of the aircraft (at least, until such time as the passengers start to become incapacitated). At the time that it becomes apparent the incapacitating aerosol has been released, it is preferably too late for the hijackers or terrorists to accomplish their goals.

Figure 2:
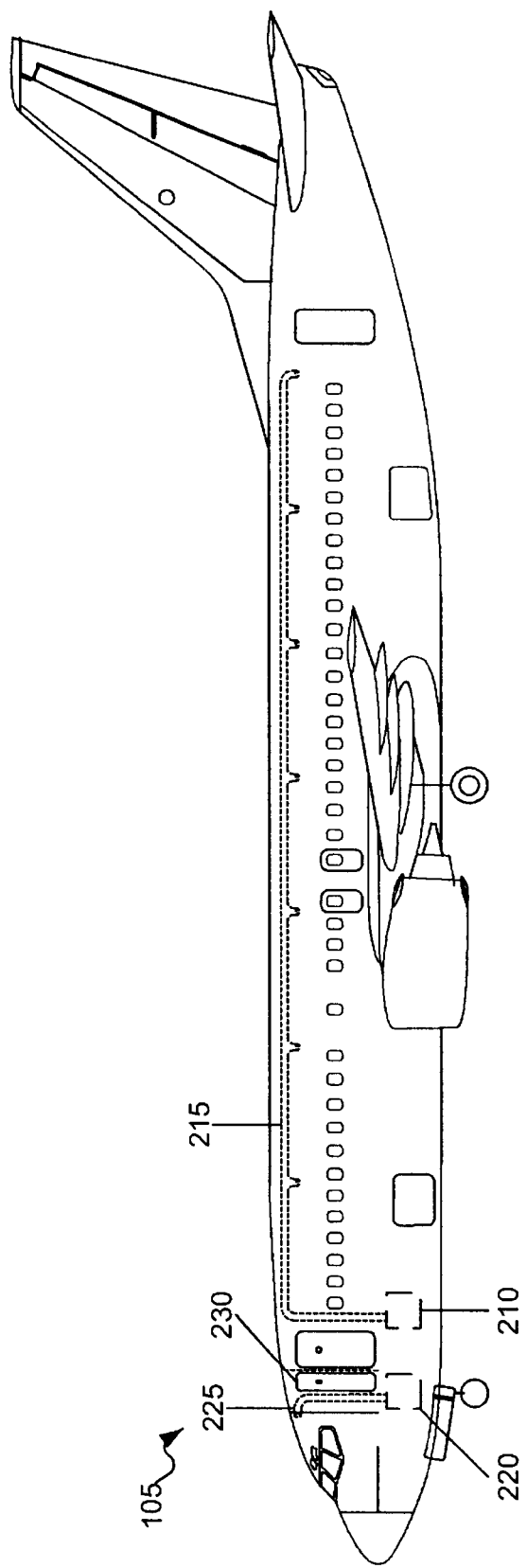
FIG. 2 shows the aircraft of FIG. 1 with a second ventilation system for the cockpit of the aircraft, according to an embodiment of the invention.

Of course, it is important that, while the terrorists or hijackers are incapacitated, the pilot of the aircraft is not. As described above with reference to FIG. 2, one embodiment of the invention involves a second ventilation system dedicated to the cockpit of the aircraft. By using a second ventilation system, the pilot is not breathing air that includes the incapacitating aerosol, and so is not subjected to its effects.

In another embodiment, as described above, a single ventilation system is used for both the cabin and cockpit of the aircraft. To safeguard the pilot from the effects of the incapacitating aerosol, a respiration system is to be provided in the cockpit of the aircraft. FIG. 4 shows two different variations of a respiration system. Respiration system 420 is a removable respiration system, whereas respiration system 425 is a fixed respiration system. Both respiration systems 420 and 425 include a mask that can be pulled over the face. The mask includes a respirator (not shown in FIG. 4) for breathing. The differences between respiration systems 420 and 425 lie in the location of the filter.

In respiration system 420, filter 427 is built into panel 407 of cockpit 410. Neither the mask nor the respirator of respiration system 420 provide for any filtering of air. As a result, respiration system 420 can be portable (since without the filter, the user will still be subject to the effects of the incapacitating aerosol). Nevertheless, it is preferred that respiration system 420 still be tethered to panel 407 in cockpit 410 (to prevent a hijacker or terrorist from being able to modify respiration system 420 and remove it from cockpit 410).

In contrast in respiration system 425, the filter is removable. In FIG. 4, filter 430 is shown being inserted into slot 435 within respiration system 425. Because the filter is part of the mask/respirator, it is important that respiration system 425 remain permanently tethered to panel 407. Otherwise, a hijacker or terrorist could simply take respiration system 425 and wander around the cabin of the aircraft without worry about the incapacitating aerosol.

Preferably, respiration systems 420, 425 connect to socket 445 in panel 407 with hose 450. Air is funneled from the ventilation systems to panel 407, through socket 445 and hose 450, to the mask and respirator, providing breathable air to the pilot.

Because respiration systems 420 and 425 using filters 427 and 430, respiration systems 420 and 425 can operate without accompanying tanks of air or oxygen. This avoids the possibility of a terrorist or hijacker using the tank for personal breathing. But tanks of air or oxygen can be connected to respiration systems 420 and 425, provided both the tanks and the respiration systems are mounted in such a way that they cannot be removed from the cockpit of the aircraft.

Once the passengers are incapacitated in the cabin of the aircraft, the pilot can fly the aircraft to the nearest safe landing strip. Local security forces, such as the police, can then board the aircraft (wearing portable respirators of their own to avoid being affected by the incapacitating aerosol). The police can then sort out who are passengers and who are terrorists/hijackers. Once the cabin has been emptied of all persons, the doors to the aircraft (including the cockpit of the aircraft: even if the cockpit has a separate ventilation system, there is always the possibility that some of the incapacitating aerosol might have leaked into cockpit) are opened and fresh air allowed to flow through the aircraft. The venting of the air can be furthered by the use of fans to force fresh air through the aircraft. Once the incapacitating aerosol has been properly vented from the aircraft, the ventilation system can be reset with a new canister of the incapacitating aerosol, and the aircraft is ready for use.

Figure 3:
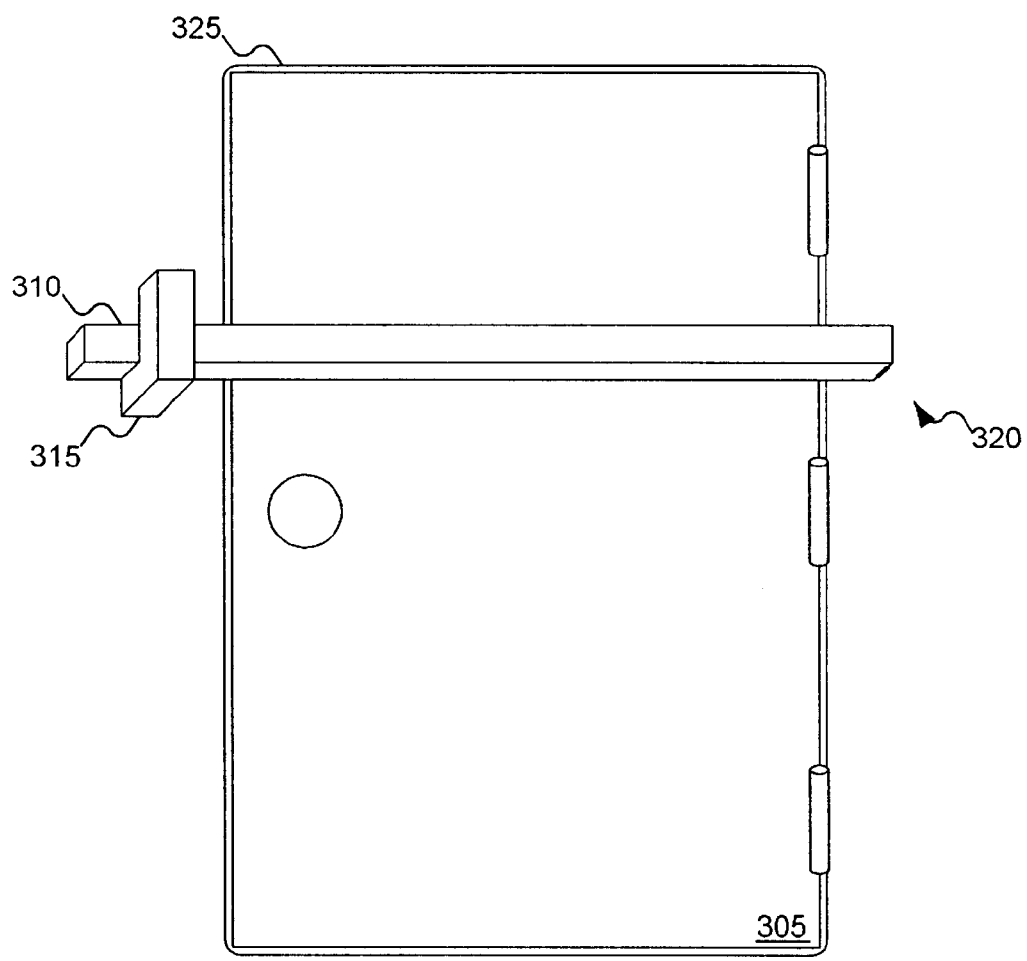
FIG. 3 shows a door to the cockpit of the aircraft of FIG. 1, the door designed so that it can be barred from entry from the cabin of the aircraft, according to an embodiment of the invention.

The use of an incapacitating aerosol to prevent hijackers or terrorists from accomplishing their missions requires the adoption of two new guidelines in aircraft safety. First, access to the cockpit of the aircraft needs to be even more tightly controlled, to prevent the hijackers/terrorists from having even a chance to control the switch releasing the incapacitating aerosol. The barricading of the door, as described with reference to FIG. 3 above, furthers this objective.

Second, security screeners at airports will need to be on the alert to prevent the introduction of respiration systems into the cabin of the aircraft. But relative to weapons, respiration systems are large and easily identified. This additional security guideline places little burden on the average citizen (other than professional or amateur scuba divers), since very few persons will bring such equipment on board an aircraft.

There is also the question of safety. Some people are allergic to anesthetics. Some people may be more sensitive to anesthetics than others. There is the risk that the use of the incapacitating aerosol could harm someone other than a hijacker or terrorist. But the likelihood of such an effect is marginal, especially relative to the risk associated with a hijacking or terrorist incident. Further, the disclaimers foisted on passengers by the airlines limit their liability from death in many circumstances. Since terrorist incidents and hijackings are otherwise completely outside the control of the airlines, the introduction of a disclaimer about the possible use of an incapacitating aerosol in such circumstances is likely to be sufficient to protect the airlines from liability.

In another embodiment, the incapacitating agent can be released through the emergency masks available for passengers in the cabin of the aircraft. In this embodiment, the emergency masks can be dropped, so that everyone can put them on, and then the incapacitating aerosol can be released through the oxygen delivery system. Since the emergency masks are usually released only if there is a problem with the air in the cabin of the aircraft (without which the passengers do not have a reason to wear the masks), the cabin of the aircraft can be depressurized to encourage people to put on the masks.

FIGS. 5A and 5B show a flowchart for using responding to an internal threat to the aircraft, according to an embodiment of the invention. At step 505 (FIG. 5A), the ventilation system of the aircraft is installed. At steps 510 and 515, either a fixed respiration system or a second ventilation system is provided for the cockpit of the aircraft. At step 520, an incapacitating aerosol (preferably, a fast-acting, colorless, odorless anesthetic) is connected to the ventilation system for the cabin of the aircraft. At step 525, the incapacitating aerosol is connected to a switch in the cockpit of the aircraft. (A person skilled in the art will recognize that steps 505–525 can be performed when the aircraft is built, overhauled, or maintained, and need not be performed at the time the aircraft is flown.) At step 530 (FIG. 5B), the cockpit is secured against entry from the cabin of the aircraft. As discussed with reference to FIGS. 2 and 3 above, this can be done by not including a door connecting the cockpit and cabin of the aircraft, or by-securing the door of the cockpit against entry from the cabin of the aircraft. At step 535, the aircraft is flown. At step 540, if a threat is detected, then (at step 545) breathable air is provided to the persons in the cockpit of the aircraft (this is discussed further with reference to FIG. 6 below). At step 550 the incapacitating aerosol is released into the ventilation system of the aircraft, to flood the cabin. of the aircraft. At step 555, the aircraft is landed at the earliest opportunity, so that security forces can board the aircraft (step 560).

Figure 6:
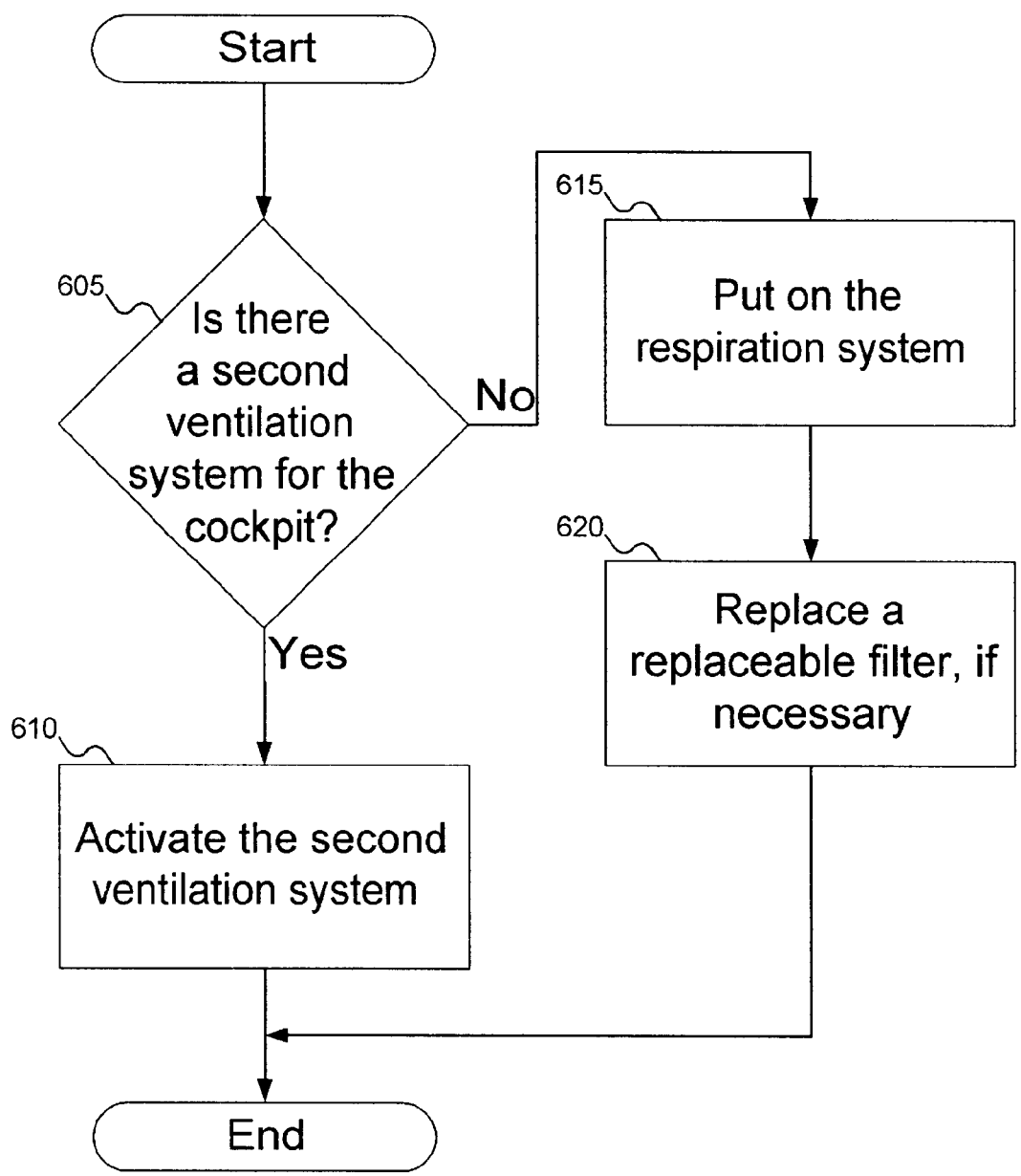
FIG. 6 shows a flowchart for preventing the incapacitating aerosol, released by the pilot of the aircraft as explained in FIGS. 5A–5B, from affecting the pilot of the aircraft, according to an embodiment of the invention.

FIG. 6 shows a flowchart for preventing the incapacitating aerosol, released by the pilot of the aircraft as explained in FIGS. 5A–5B, from affecting the pilot of the aircraft, according to an embodiment of the invention. At step 605, if a second ventilation system is available, then (at step 610) the second ventilation system is activated. Otherwise, at step 615, the pilot puts on the respiration system (fixed or portable). At step 620, if necessary, a replaceable filter in the respiration system can be replaced.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

What is claimed is:

1. An aircraft, comprising the improvement of:
   a cockpit of the aircraft that can be made inaccessible from a cabin of the aircraft;
   an incapacitation switch located in the cockpit of the aircraft;
   a ventilation system for the aircraft, the ventilation system to circulate air through the cabin of the aircraft and through the cockpit of the aircraft, the ventilation system including an incapacitation device designed to release an incapacitating aerosol into the ventilation system responsive to the incapacitation switch; and
   a fixed respiration system located in the cockpit of the aircraft, the fixed respiration system providing breathable air to a crew of the aircraft in the cockpit of the aircraft.

2. An aircraft according to claim 1, wherein the fixed respiration system is designed to filter the incapacitating aerosol from the circulating air.

3. An aircraft according to claim 2, wherein the fixed respiration system includes:
   a mask that can be pulled over a person's head; and
   a filter within the respirator designed to filter out the incapacitating aerosol from the circulating air, leaving only the breathable air for the person to breathe.

4. An aircraft according to claim 3, wherein the filter is replaceable.

5. An aircraft according to claim 3, wherein the fixed respiration system further includes a permanent tether connecting the mask and filter to the cockpit in such a way that the mask and filter cannot be removed from the cockpit.

6. An aircraft according to claim 1, wherein the fixed respiration system is designed to provide breathable air from a second ventilation system not circulating the incapacitating aerosol.

7. An aircraft according to claim 6, wherein the fixed respiration system includes:
   a mask that can be pulled over a person's head;
   a respirator in the mask designed to deliver the breathable air to the person; and
   a hose, the hose having a first end and a second end, the first end of the hose connected to the respirator, the hose providing breathable air to the person, the second end of the hose connected to a mounting point in the cockpit, the mounting point providing the breathable air from the second ventilation system.

8. A method for responding to a threat to an aircraft, comprising:
   securing a cockpit of the aircraft, so that the cockpit of the aircraft cannot be accessed from a cabin in the aircraft;
   releasing an incapacitating aerosol into a ventilation system of the aircraft, so as to incapacitate the, threat to the aircraft; and
   wearing a fixed respiration system by a crew of the aircraft while flying the aircraft after releasing the incapacitating aerosol into the ventilation system.

9. A method according to claim 8, wherein wearing a fixed respiration system includes breathing air provided by a second ventilation system of the aircraft, the second ventilation system designed so that it does not circulate air circulated by the ventilation system.

10. A method according to claim 8, wherein wearing a fixed respiration system includes filtering the incapacitating aerosol by the fixed respiration system.

* * * * *

UNITED STATES PATENT AND TRADEMARK OFFICE
CERTIFICATE OF CORRECTION

PATENT NO.     : 6,499,693 B1
DATED          : March 24, 1998
INVENTOR(S)    : Ariel S. Rogson It is certified that error appears in the above-identified patent and that said Letters Patent is hereby corrected as shown below:

<u>Column 1,</u>
Line 24, "airport-security" should read -- airport security --

<u>Column 7,</u>
Line 41, "by-securing" should read -- by securing --

<u>Column 8,</u>
Line 53, "incapacitate the," should read -- incapacitate the --

Signed and Sealed this

First Day of July, 2003

JAMES E. ROGAN
*Director of the United States Patent and Trademark Office*